United States Patent
Muñiz Casais et al.

(10) Patent No.: US 9,712,004 B2
(45) Date of Patent: Jul. 18, 2017

(54) PERMANENT MAGNET ROTOR WITH PERMANENT MAGNET MODULES ARRANGED ON THE ROTOR

(71) Applicant: ALSTOM RENEWABLE TECHNOLOGIES, Grenoble (FR)

(72) Inventors: César Muñiz Casais, Taradell (ES); Santiago Claramunt Estecha, Barcelona (ES); Glenn Ardley, Birr (CH)

(73) Assignee: ALSTOM Renewable Technologies, Grenoble (FR)

( * ) Notice: Subject to any disclaimer, the term of this patent is extended or adjusted under 35 U.S.C. 154(b) by 277 days.

(21) Appl. No.: 14/386,777

(22) PCT Filed: Mar. 28, 2013

(86) PCT No.: PCT/EP2013/056690
§ 371 (c)(1),
(2) Date: Sep. 19, 2014

(87) PCT Pub. No.: WO2013/144287
PCT Pub. Date: Oct. 3, 2013

(65) Prior Publication Data
US 2015/0048620 A1 Feb. 19, 2015

Related U.S. Application Data

(60) Provisional application No. 61/653,294, filed on May 30, 2012.

(30) Foreign Application Priority Data

Mar. 30, 2012 (EP) ..................... 12382116

(51) Int. Cl.
*H02K 1/27* (2006.01)
*H02K 1/32* (2006.01)
*H02K 7/18* (2006.01)

(52) U.S. Cl.
CPC ............. *H02K 1/27* (2013.01); *H02K 1/2773* (2013.01); *H02K 1/2786* (2013.01); *H02K 1/32* (2013.01);
(Continued)

(58) Field of Classification Search
CPC ...... H02K 1/27; H02K 1/2773; H02K 1/2786; H02K 1/32; H02K 7/183; H02K 7/1838; H02K 2213/12; Y02E 10/725
(Continued)

(56) References Cited

U.S. PATENT DOCUMENTS 5,914,552 A * 6/1999 Hsu .................. H02K 1/278
310/156.18
2010/0072831 A1 3/2010 Gadelmeier et al.
(Continued)

FOREIGN PATENT DOCUMENTS

DE 10 2005 042543 3/2007
DE 102005042543 A1 * 3/2007 ........... H02K 1/2766
(Continued)

OTHER PUBLICATIONS

Machine translation of DE 102005042543 A1 (Mar. 2007).*
(Continued)

*Primary Examiner* — Michael Andrews
(74) *Attorney, Agent, or Firm* — Dority & Manning, P.A.

(57) ABSTRACT

A permanent magnet rotor comprising a rotor rim and a plurality of permanent magnet modules arranged on the outer or inner circumference of the rotor rim, the permanent magnet modules extending generally along an axial direction and being of substantially constant axial-cross section, and comprising a base adapted to be fixed to the rim of the generator rotor, one or more permanent magnets, and one or more pole pieces, wherein each of the permanent magnets has a circumferential magnetic orientation and is substantially rectangular in axial cross-section and wherein each of the permanent magnets is inclined with respect to the central radial plane of the module.

15 Claims, 6 Drawing Sheets

(52) U.S. Cl.
CPC ........... *H02K 7/183* (2013.01); *H02K 7/1838* (2013.01); *H02K 2213/12* (2013.01); *Y02E 10/725* (2013.01)

(58) Field of Classification Search
USPC ...... 310/156.16, 61, 156.56, 156.57, 156.59, 310/156.41, 156.61
See application file for complete search history.

(56) References Cited

U.S. PATENT DOCUMENTS

| | | | |
|---|---|---|---|
| 2010/0264775 A1* | 10/2010 | Balzer | H02K 1/223 310/216.133 |
| 2011/0266811 A1 | 11/2011 | Smadja | |

FOREIGN PATENT DOCUMENTS

| | | |
|---|---|---|
| EP | 1 763 121 | 3/2007 |
| EP | 1763121 A2 | 3/2007 |
| EP | 2 242 165 | 10/2010 |
| EP | 2 523 316 | 11/2012 |
| EP | 2 645 535 | 10/2013 |
| EP | 2 645 537 | 10/2013 |
| GB | 1277492 A | 6/1972 |
| JP | 2007295752 A | 11/2007 |
| WO | 2011124232 A1 | 10/2011 |

OTHER PUBLICATIONS

International Search Report and Written Opinion for PCT/EP2013/056690, mailed Oct. 7, 2013, 11 pgs.
European Search Report and Written Opinion issued in connection with Corresponding Application No. 12382116.7 on Aug. 7, 2012.
International Search Report and Written Opinion issued in connection with Corresponding Application No. PCT/EP2013/056690 on Oct. 7, 2013.
Unofficial English translation of Office Action issued in connection with corresponding CN Application No. 201380016977.6 on May 25, 2016.

* cited by examiner

PERMANENT MAGNET ROTOR WITH PERMANENT MAGNET MODULES ARRANGED ON THE ROTOR

This is a National Stage Application of International Application No. PCT/EP2013/056690 filed Mar. 28, 2013, which claims priority to European Patent Application No. EP 12382116.7 filed Mar. 30, 2012 and U.S. Provisional Application No. 61/653,294 filed May 30, 2012, the contents of which are hereby incorporated by reference in their entirety for all purposes.

This application claims the benefit of European Patent Application 12382116.7 filed 30 Mar. 2012 and U.S. Provisional Patent Application Ser. No. 61/653,294 filed 30 May 2012.

The present invention relates to a permanent magnet rotor for an electrical machine, and more particularly relates to a generator rotor that is especially suitable for a wind turbine.

BACKGROUND ART

Electrical machines, such as motors and generators having a rotor with permanent magnets are known. They are generally deemed to be reliable and require less maintenance than other generator topologies.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Particularly for offshore wind turbines, direct drive systems employing permanent magnets are usually chosen.

Such a direct drive wind turbine generator may have e.g. a diameter of 6-8 meters and a length of e.g. 2-3 meters. Hundreds of magnets may need to be attached, e.g. by screwing or gluing to the circumference of the rotor. It will be clear that this manufacturing process can be cumbersome.

Furthermore, if one or more magnets is damaged and needs to be replaced, the access to these magnets can be complicated (especially with large size generators), such that maintenance can become very expensive.

This size and type of generator however is not limited to offshore applications, and not even to the field of wind turbines only. Generators of considerable dimensions that may suffer from the same problems and/or have the same complications may also be found e.g. in steam turbines and water turbines. Also relatively large permanent magnet motors may have the same or similar problems.

Cooling of the components is generally an important requirement in electrical machines. A cooling air flow may be established by the rotation of the rotor. In some implementations, an additional cooling air flow may be provided by a dedicated fan. Furthermore, in some implementations a liquid cooling circuit may be provided. Incorporation of a cooling circuit may further complicate the assembly and manufacture of large permanent magnet generators. A plurality of radial cooling holes may need to be drilled. These radial holes may complicate manufacture and assembly and will generally not lead to homogeneous cooling.

SUMMARY OF THE INVENTION

In a first aspect, the present invention provides a permanent magnet rotor comprising a rotor rim and a plurality of permanent magnet modules arranged on the outer or inner circumference of the rotor rim. The permanent magnet modules extend generally along an axial direction and are of substantially constant axial-cross section. The modules comprise a base adapted to be fixed to the rim of the generator rotor, one or more permanent magnets, and one or more pole pieces. Each of the permanent magnets has a circumferential magnetic orientation and is substantially rectangular in axial cross-section and each of the permanent magnets is inclined with respect to the radial plane of the magnet.

In this aspect of the invention, a permanent magnet rotor is provided for which the assembly and maintenance is facilitated. Both for repair and manufacture, modules of magnets can be relatively easily inserted in place and removed. Additionally, the inclined magnets lead to beneficial power and torque characteristics.

Herein, axial cross-section may be defined as the cross-section with a plane that is perpendicular to the rotational axis of the rotor. An axial direction may be defined as a direction coinciding with the rotational axis of the rotor or parallel thereto.

In some embodiments, one or more of the permanent magnet modules may comprise two axial rows of magnets. In preferred embodiments, all the modules may be substantially identical. The assembly of the generator rotor may thus be simplified. In alternative embodiments, modules with a single row of permanent magnets may be used. Not all modules are necessarily identical in this configuration. The axial rows of magnets may include, a single magnet, or two or more magnets axially positioned behind each other.

In some embodiments, one or more of the permanent magnet modules may comprise a first row and a second row of permanent magnets and a central cooling channel arranged between said first and second row. Such a central cooling channel may be formed as an orifice extending axially through the permanent magnet modules. In some embodiments, one cooling channel may be incorporated at the foot (i.e. inner end) of each of the (rows of) magnets, and/or at least one cooling channel may be incorporated at the top (i.e. outer end) of each of the (rows of) magnets. In some embodiments, a cooling channel may be arranged at one or more of the four corners of one or more of the magnets.

In some embodiments, the axial cooling channel may be delimited by one or more of the magnets. The cooling may thus more effectively cool the magnets. Additionally, the cooling channel may be formed e.g. by punching or laser cutting at the same time that the slots/holes for the magnets are formed.

In some embodiments, the base and pole pieces of the permanent magnet modules may be integrally formed and the magnets may be embedded in the permanent magnet modules. If the base and pole pieces are integrally formed (i.e. they form a monolithic piece) in axial cross-section, the manufacturing tolerances for the modules may be reduced. Alternatively, the magnets may be glued and/or screwed on top of the base or pole pieces.

In some embodiments, the rotor may comprise a plurality of anchors for fixing the permanent magnet modules to the rotor rim, wherein the permanent magnet modules comprise a base having a bottom surface adapted to be fit to the inner or outer circumference of the rotor rim, and two axially extending side surfaces, and the two side surfaces of the base of the permanent magnet modules each comprise an axially extending groove, and wherein the anchors have a shape that fits in axially extending grooves of neighbouring permanent magnet modules. Optionally, these anchors may be substantially T-shaped.

In these embodiments, a particularly easy way of installing the modules on the rotor rim is provided. The anchors may first be loosely attached to the rotor rim. After placement of the module, the anchor may be tightened and may engage with the base of the module.

In other embodiments, each of the permanent magnet modules may comprise a plurality of radial holes arranged at different axial positions), and the permanent magnet modules may be fixed to the rotor rim by a plurality of bolts inserted in the radial holes.

In yet a further aspect, the disclosure provides a wind turbine comprising a generator having a rotor substantially as hereinbefore described. In some implementations, the wind turbine may be a direct drive wind turbine. In particular, the wind turbine may be an offshore direct drive wind turbine.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
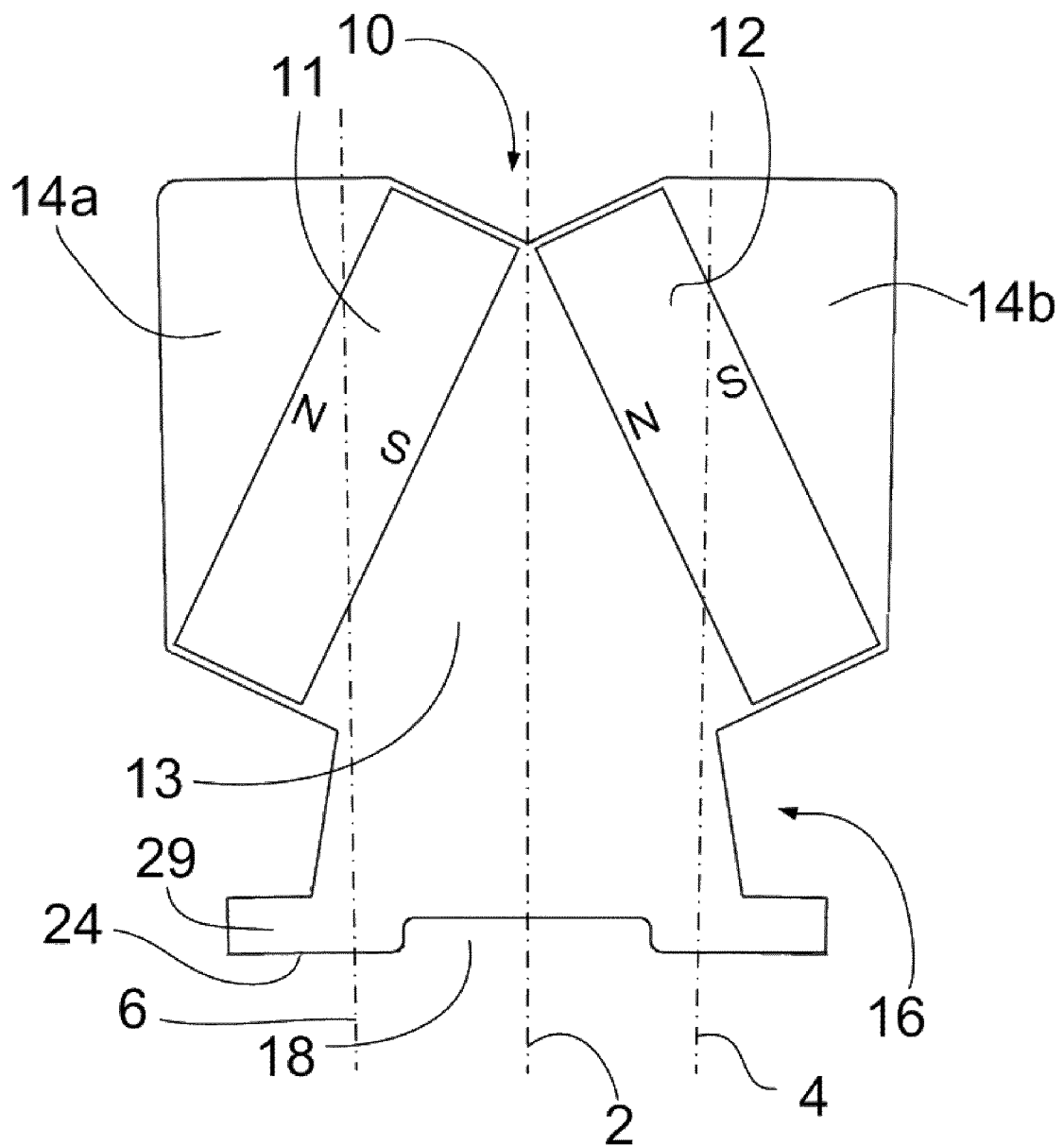
FIG. 1 illustrates an axial cross-section of a permanent magnet module in accordance with a first embodiment of the present invention.

FIG. 1 illustrates an axial cross-section of a permanent magnet module in accordance with a first embodiment of the present invention. Permanent magnet module 10 comprises a base 13, a first axial row of permanent magnets 11 and a second axial row of permanent magnets 12. The axial rows of magnets may be a single magnet, or a plurality of magnets axially positioned behind each other.

The North and South of the permanent magnets are indicated in FIG. 1. The magnets have a circumferential magnetic orientation (also sometimes referred to as "transversal" or "tangential" orientation), i.e. the North and South of each of the magnets are arranged in the rotor next to each other in a circumferential (or "tangential") direction.

The magnets may be inclined towards a central radial plane 2 of the module. The magnets do not extend along the local radial planes 4 and 6 (the radial planes passing through the center of the magnets), but instead are inclined with respect to these planes, as illustrated in FIG. 1. The magnetic flux lines from the North of the second magnet 12 to the South of the first magnet 11 will be substantially straight, i.e. horizontal. The two magnets together may form a single pole, and the magnetic flux lines from the North of the first magnet to the South on the second magnet will enclose a winding arranged on the stator (not shown). Pole pieces 14a and 14b act as flux concentrators.

The permanent magnet module may be of substantially constant cross-section and may comprise a stack of metal sheets. The metal sheets of the stack may be welded stuck to each other, or may be joined e.g. by adhesives.

Such a laminated structure may reduce or avoid eddy currents. The metal sheets may be formed by punching or e.g. laser cutting and may be glued together. Rectangular through-holes may be formed in the metal sheets so as to embed the rectangular permanent magnets. These holes may also be formed e.g. by punching or by laser cutting. In alternative embodiments, instead of a stack of metal sheets, an integral piece could be used. Embedding the magnets in this way reduces the part count and as a result of the reduction of components that are to be assembled, tolerances may automatically decrease.

The magnets may be securely fixed using suitable adhesive. At both the front and the rear end, the magnets may be sealed from the outside using e.g. end plates and/or epoxy resin.

The base 13 has an upper portion with a substantially isosceles triangular cross-section with the permanent magnets arranged along the sides of the triangle. The bottom of the base of the module may be adapted to fit on the inner or outer circumference of the rotor rim. The bottom 24 of the base may thus be slightly curved.

A weight saving recess 18 may be provided at the bottom. The side surfaces of the base may comprise grooves 16. The base 13 may comprise legs 29 forming the lower end of the grooves. Suitably shaped anchors may be used for fixing the permanent magnet modules to the rotor rim. The anchors may be of such shape that they engage with the surfaces of the grooves 16 (and legs 29) when fixed to the rotor rim.

To assemble the rotor, the anchors may be loosely attached at the circumference of the rotor rim. Then, the permanent magnet modules 10 may be inserted and slid between two neighbouring anchors. Then, to fix the magnet modules in place, the bolts of the anchors may be tightened, so that the anchors press a portion of the base against the circumference of the rotor rim.

In this aspect, a permanent magnet rotor is provided for which the assembly and maintenance is facilitated. Both for repair and manufacture, modules of magnets can be relatively easily inserted and removed. Friction between the magnets and rotor rim during installation and/or maintenance may be avoided.

Since the grooves in the side surfaces of the modules are substantially larger than the corresponding side portions of the anchors, a space remains between two modules. This space may serve for cooling.

The base 13 and pole pieces may e.g. be made from steel or another magnetically conducting material. The permanent magnets may be made e.g. from AlNiCo steel (Aluminium-Nickel-Cobalt), rare earth magnetic materials such as neodymium (NdFeB), or samarium-cobalt, but may also be made from e.g. ceramic materials.

Figure 2:
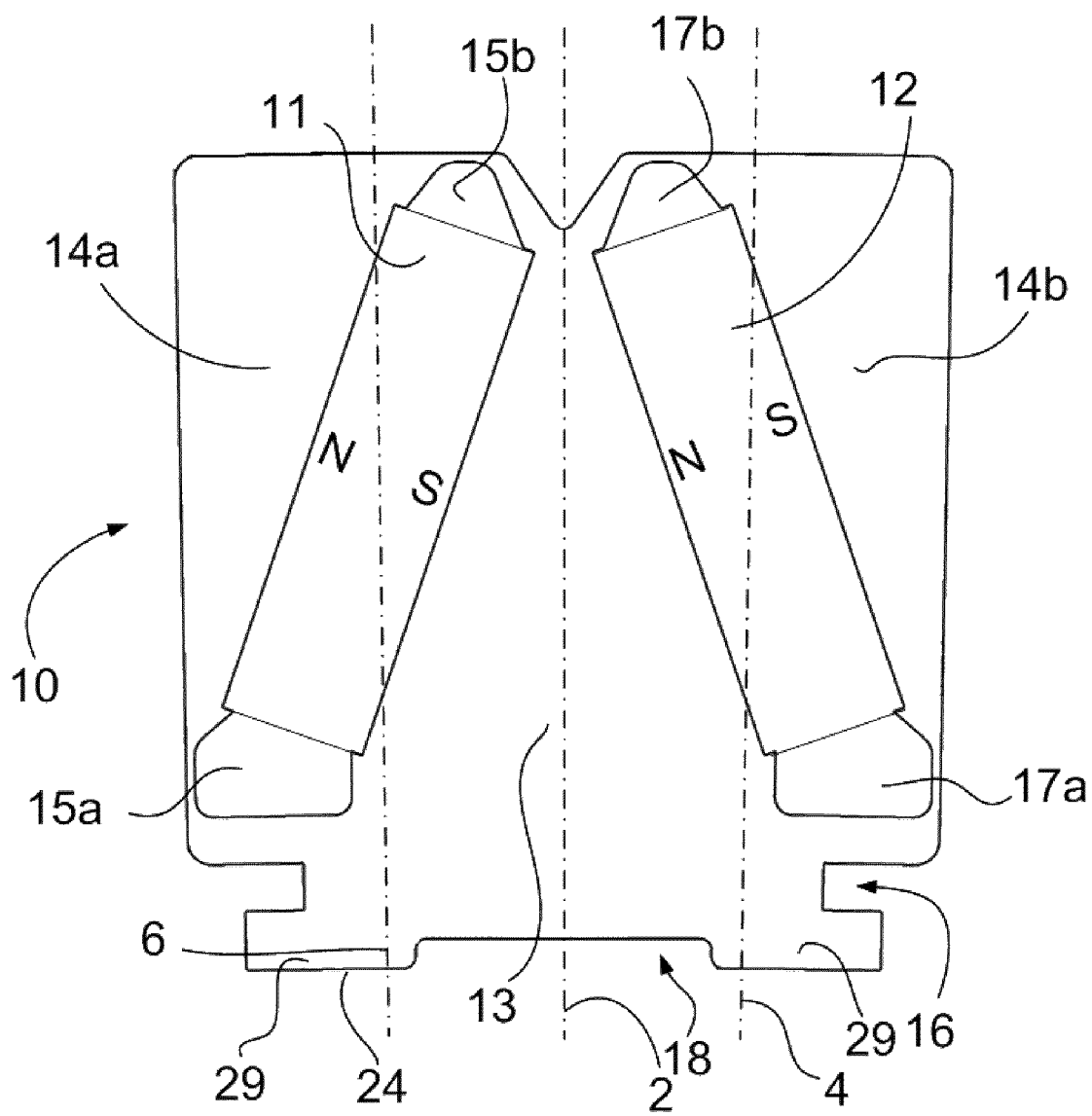
FIG. 2 illustrates an axial cross-section of a permanent magnet module in accordance with another embodiment of the present invention.

FIG. 2 schematically illustrates a cross-section of a permanent magnet module according to another embodiment. In this case, each module may comprise two rows of embedded permanent magnets which are inclined with respect to the local radial planes and may be towards a central radial plane, substantially similar to the embodiments illustrated in FIG. 1.

In this embodiment, an axially extending cooling channel 15a is provided at the foot (i.e. inner end) of the first magnet 11. Another cooling channel 15b is provided at the top (i.e. outer end) of the first magnet. Similar cooling channels 17a and 17b are provided at the foot and top of the second magnet respectively. The cooling channels are incorporated in the module in this configuration, which facilitates the manufacture and assembly while assuring enough cooling.

The bottom 24 of the base comprises grooves 16, which in this case may be formed by straight cut-outs. The permanent magnets may be embedded in a similar way as described before. T-shaped anchors may sit substantially exactly in the grooves 16.

Figure 3A:
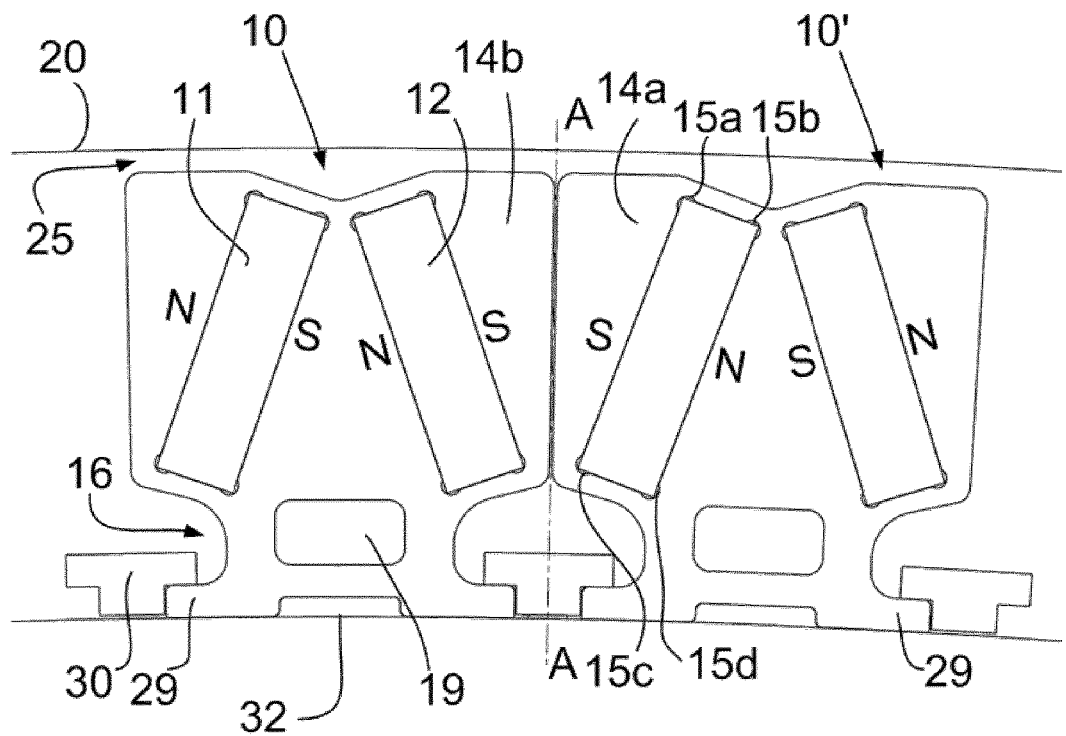
FIGS. 3a-3b schematically illustrate a rotor in accordance with further embodiments of the present invention.
Figure 3B:
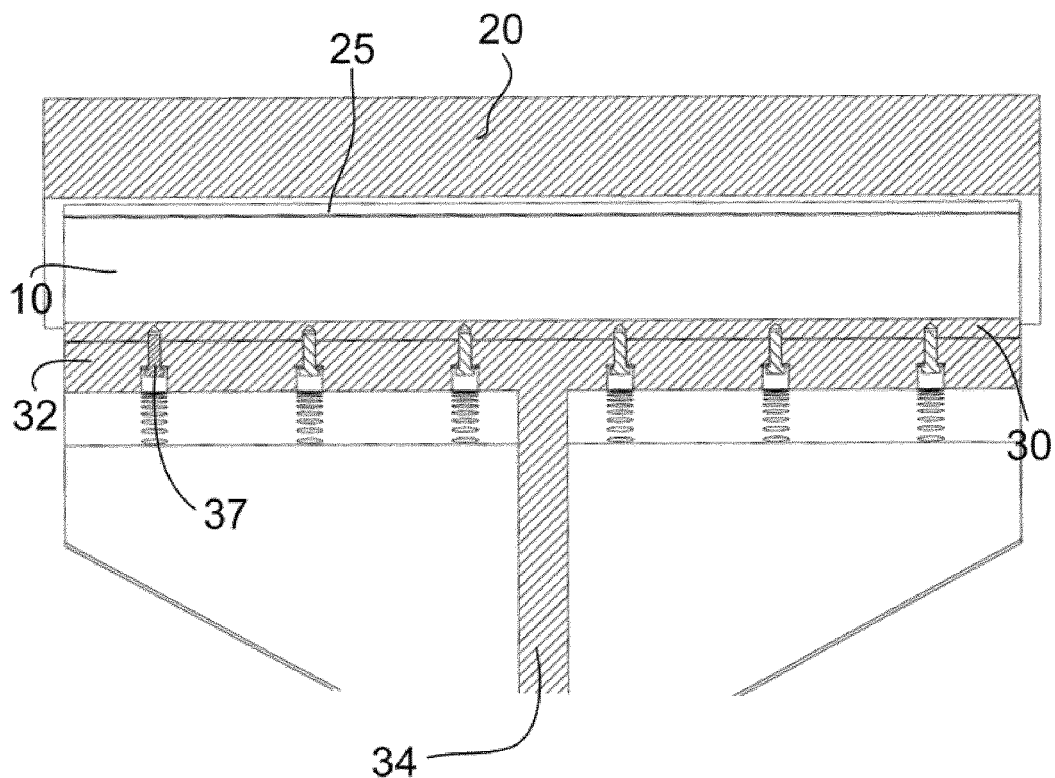

FIGS. 3a and 3b illustrate another embodiment in axial cross-section and in radial cross-section respectively.

FIG. 3a illustrates two permanent magnet modules installed on the rotor rim next to each other. Each of the modules 10 and 10' comprises a first magnet 11 (or first row of magnets) and a second magnet 12 (or second row of magnets) which are rectangular and are inclined with respect to the local radial planes of the magnets.

The permanent magnet modules have a circumferential magnetic orientation.

It may be seen that the magnetization of the magnets of one module is the opposite of the magnetization of the magnets of the neighbouring module. Pole pieces 14a and 14b may act as flux concentrators.

In alternative embodiments, the two neighbouring modules could be formed as a single module.

Also illustrated in FIG. 3a are the stator 20 and the air gap 25 between rotor and stator. In this embodiment, the stator substantially surrounds the rotor. In other implementations, the rotor may surround the stator.

The permanent magnet modules may comprise a central cooling channel 19. Further, smaller cooling channels 15a, 15b, 15c and 15d may be provided in the four corners of the rectangular magnets. The magnets may be embedded in the permanent magnet modules. To form the cooling channels in the corners of the permanent magnets, the axial holes in which the permanent magnets may be inserted may incorporate rounded corners. The holes may be formed by e.g. punching or laser cutting. The space not occupied by the magnets after their insertion may serve as cooling channel(s).

T-shaped anchors 30 may be used to attach the modules to the outer circumference of the rotor rim 32. The two sideways extending anchoring portions of the T-shaped anchor fit in a corresponding groove 16 of the permanent magnet modules and thus lock the legs 29 of the permanent magnet module in place.

The attachment of the permanent magnet modules to the rotor rim may further be seen in FIG. 3b, which represents a radial cross-section along line A-A indicated in FIG. 3a. The central rotor structure of the rotor may comprise spokes that are substantially T-shaped in radial cross-section. However, any other alternative central rotor structure supporting the rotor rim may be used.

In the embodiments illustrated in FIGS. 1-3, the pairs of (rows of) embedded magnets of the modules are arranged as an inverted "V". This disposition of magnets may have advantages during assembly and installation. Neighbouring modules repel each other, which may facilitate assembly. Additionally, it may be easier to magnetize the permanent magnets.

Figure 4A:
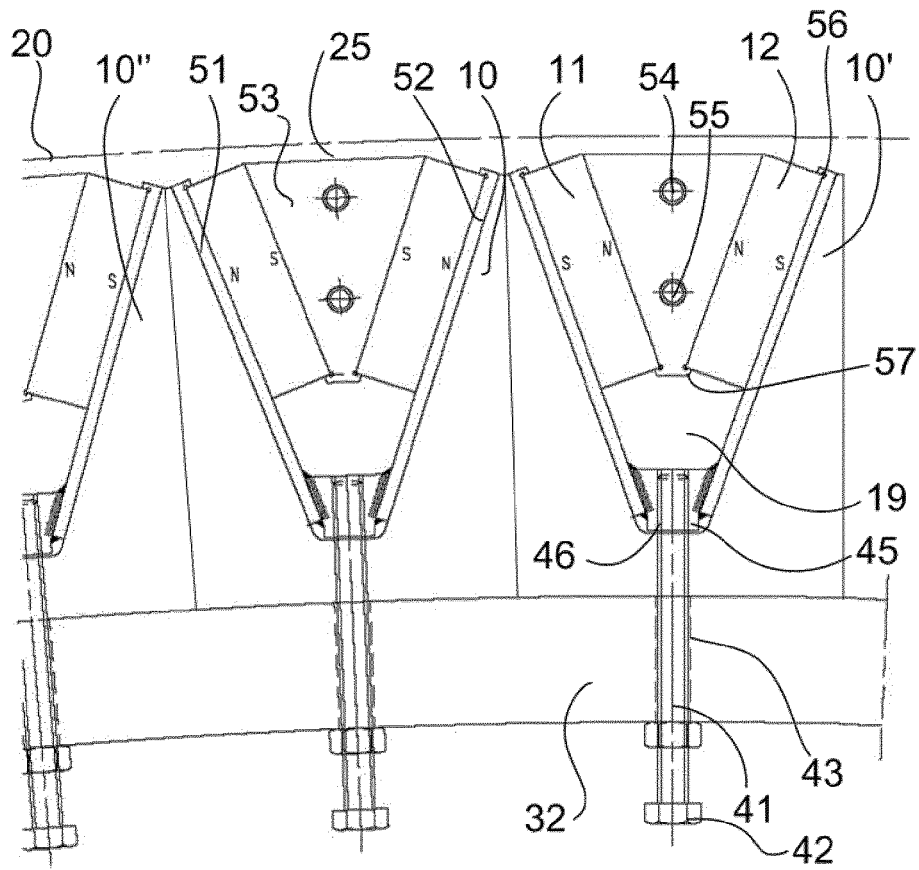
FIGS. 4a and 4b schematically illustrate a rotor in accordance with further embodiments of the present invention.
Figure 4B:
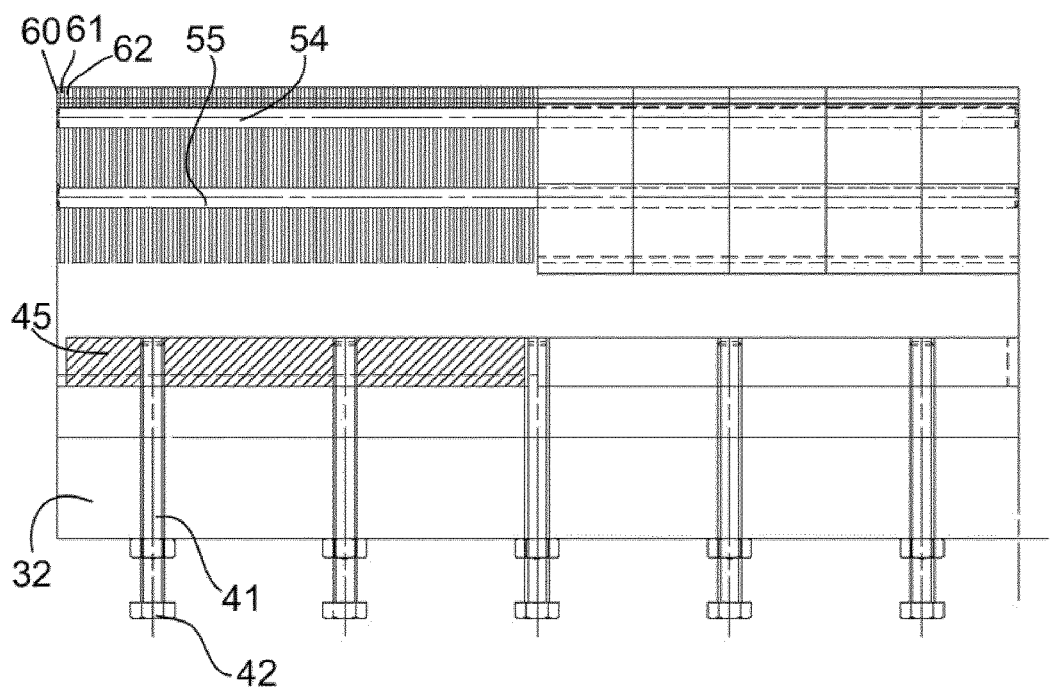

FIGS. 4a and 4b illustrate further embodiments, in which the rows of permanent magnets are not embedded in the modules. Permanent magnet modules 10, 10' and 10" in this case comprise a base, magnet support side plates 51 and 52, and central magnet support structure 53, which acts as a flux concentrator. The central magnet support structure 53 may be regarded as composed of two pole pieces.

The base and central magnet support structure may be formed as a stack of metal sheets 60, 61, 62 etc. as illustrated in FIG. 4b. The stack of sheets may be glued together. In the implementation illustrated in FIGS. 4a and 4b, the stack of metal sheets is further held together by rods 54 and 55 that exert a pressure on the stack of sheets.

The module may further comprise a bar 45 to which magnet support plates are attached, e.g. by brazing. The magnet support plates 51 and 52 may comprise ends 56 that are formed to retain magnets 11 and 12. The side support plates may be substantially flat and comprise upstanding end portions 56.

The central magnet support structure 53 may be shaped substantially as an inverted triangle in axial cross-section. The magnets 11 and 12 may be arranged along the sides of the central magnet support structure and may be attached to both the central support structure and to the side support plates by suitable adhesives. In its apex (i.e. at the bottom of the inverted triangle), the central support structure may comprise a shape adapted to retain the magnets, e.g. two lateral protrusions 57 that cooperate with the end portions of the side support plates to mechanically retain the magnets.

Also in this embodiment, the rows of magnets may be substantially inclined providing the same advantages with respect to torque and power.

To mount the modules, a plurality of radial mounting holes is foreseen in the rotor rim and corresponding radial mounting holes are foreseen in the bar 45. After positioning of the module on the rotor rim, bolts 42 may be introduced in the radial mounting holes and fix the modules in place.

Figure 5A:
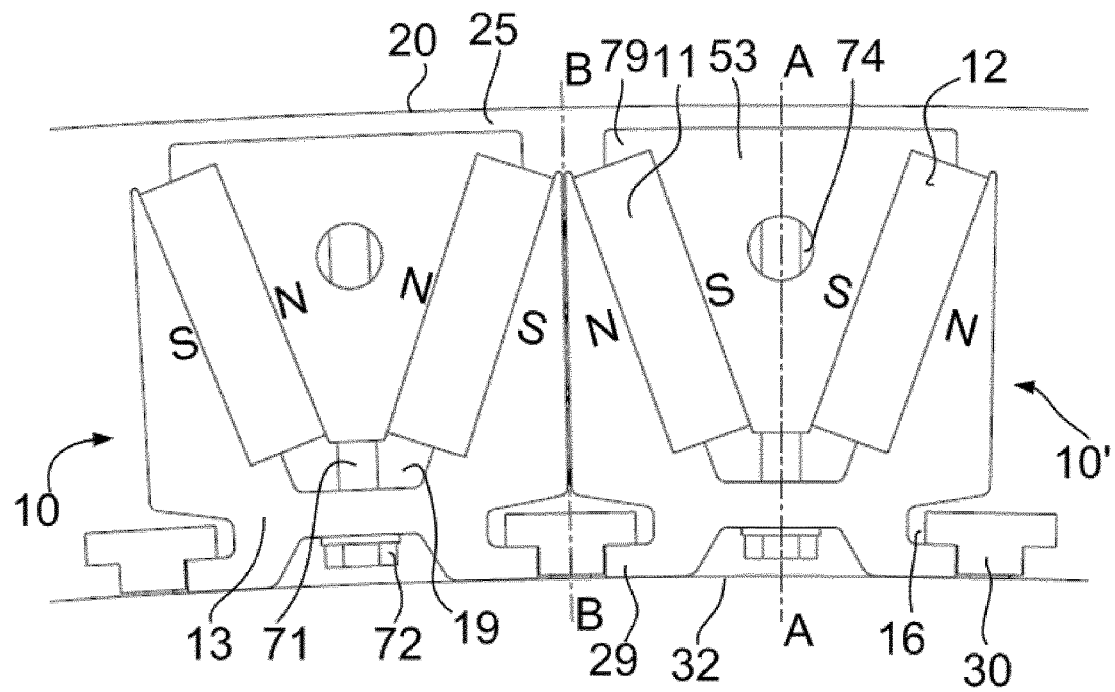
FIGS. 5a-5c schematically illustrate a rotor in accordance with yet further embodiments of the present invention.
Figure 5B:
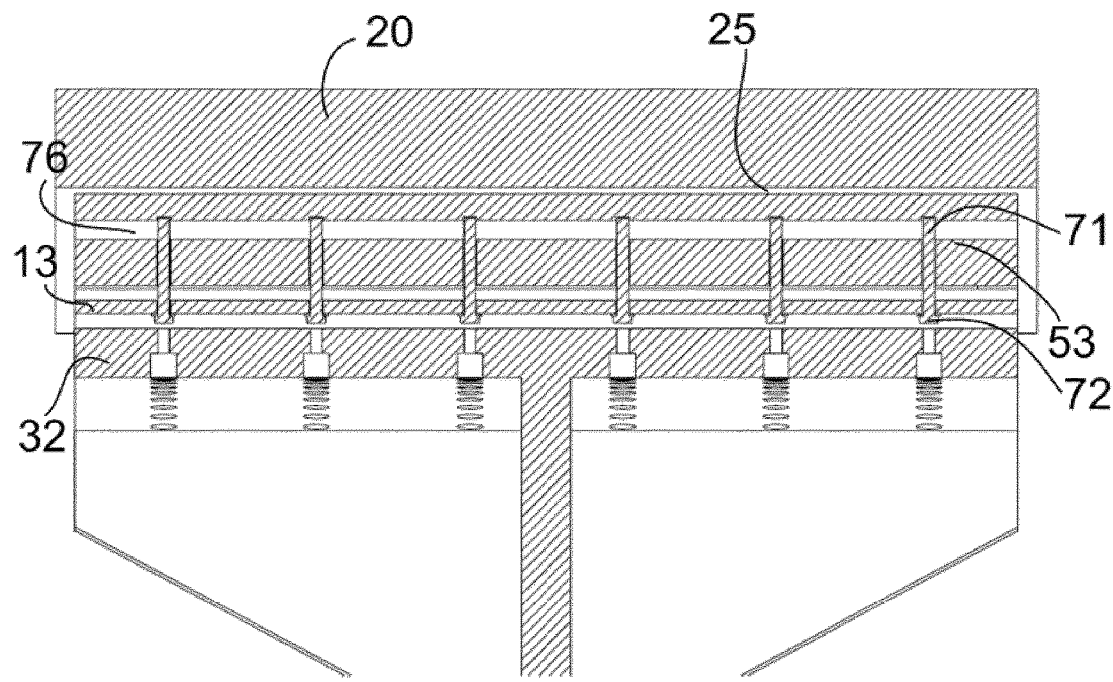
Figure 5C:
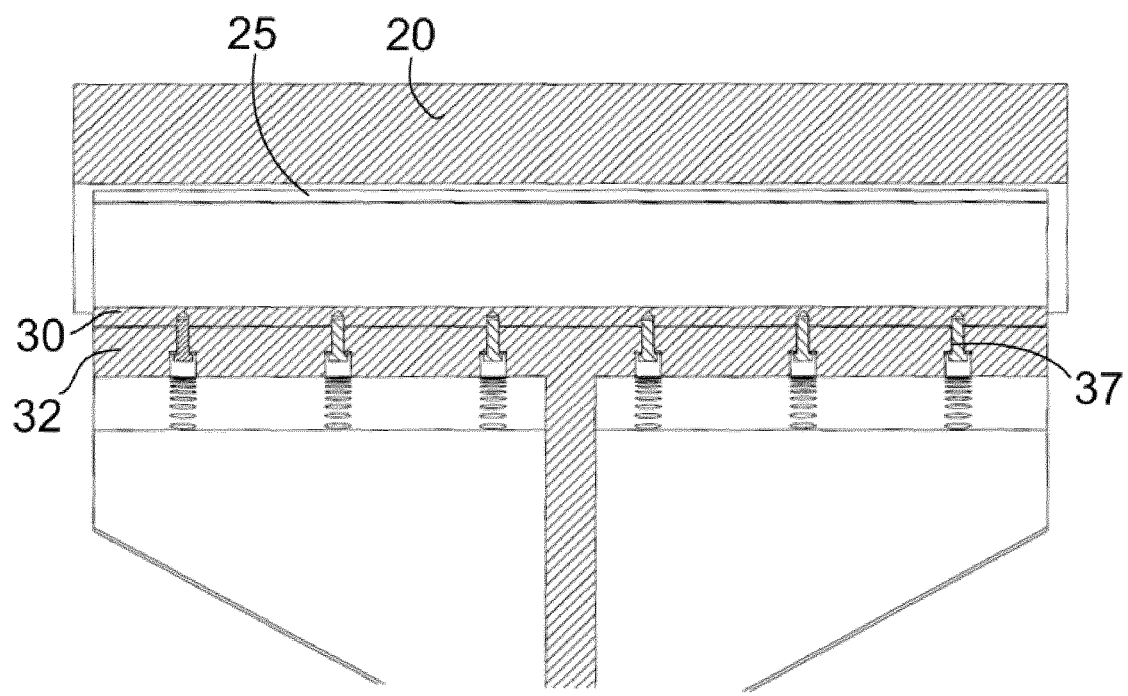

FIGS. 5a-5c schematically illustrate yet further embodiments of the present invention. FIG. 5a illustrates an axial cross-section of a rotor rim with two permanent magnet modules. FIG. 5b shows a radial cross-section along line A-A indicated in FIG. 5a. FIG. 5c shows a radial cross-section along line B-B indicated in FIG. 5a.

The embodiment of the generator rotor illustrated in FIG. 5a comprises a plurality of permanent magnet modules 10 and 10' attached to the rotor rim 32. The advantages related to the use of modules are also obtained in this embodiment.

Each permanent magnet module comprises a first row of magnets 11 and a second row of magnets 12 and a central cooling channel 19 located between the first and second rows. The axial cooling channel incorporated in the modules is able to provide cooling without complicating the manufacture and assembly of the generator rotor.

The permanent magnets may be of generally rectangular cross-section and may be inclined towards a central radial plane (line B-B) of the permanent magnet module. The magnets may have a circumferential magnetic orientation as indicated in FIG. 5a. The circumferential magnetization and the inclination of the magnets provide beneficial power and torque characteristics to the generator.

The permanent magnet module may comprise a central magnet support 53 which acts as a flux concentrator with a cross-section that is substantially close to an inverted triangle, similar to the embodiment illustrated in FIG. 4a. At the top two vertices of the triangle, lateral hooks 79 may be incorporated in order to mechanically lock the permanent magnets in between the central magnet support structure 59 and the base 13 of the permanent magnet module.

The central magnet support structure 53 may comprise an axial hole 74 in which a rod 76 may be inserted. A plurality of radial holes, at different axial positions, may be drilled in the central magnet support structure. Rod 76 may comprise a number of transverse through-holes, such that when the rod is inserted, the transverse through-holes are lined up with the radial holes of the magnet support structure. Bolts 71 with nuts 72 may be inserted in these radial holes and may extend into and beyond the transverse holes of rod 76, into an upper portion of the central magnet support structure 53. The permanent magnets may thus be clamped between base 13 and central magnet support structure 53. An alternative secure way of fixing the magnets in the module may thus be established.

The base 13 may comprise, as shown in other embodiments, side surfaces with grooves 16. Anchors 30 with a shape that is substantially complementary to the shape of the groove may press the legs 29 of base 13 against the rotor rim and fix the permanent magnet module in place.

In the embodiments of FIGS. 4 and 5, the pairs of (rows of) embedded magnets of the modules are arranged as a "V". This disposition of magnets in combination with the integrated cooling channels may reduce leakage of magnetic flux.

Inclination of the magnets with respect to the corresponding local radial plane (radial plane passing through the center of the magnet) may vary. The angle of inclination with respect to the radial plane may be in the range of 0-90°, more particularly in the range of 10°-50°, in particularly between 10° and 40°.

The permanent magnet modules as illustrated herein may have a length that substantially corresponds to the axial length of the electrical machine, e.g. a generator or motor; each permanent magnet module thus spans substantially the entire length of the electrical machine. In other embodiments, the length of a module may be substantially half of the axial length of the electrical machine; two permanent magnet modules span the length of the electrical machine. In these cases, one module may be inserted from the front and one module may be inserted from the rear. Similarly, in some embodiments, the anchors may span the length of the electrical machine. In other embodiments, the anchors may be divided in various segments that together span the length of the electrical machine.

In most of the embodiments illustrated herein, T-shaped anchors were used to securely fix the base of the modules to the rotor rim. In other embodiments, other anchors may be used that have a different shape that is substantially complementary to the grooves formed in the side surfaces of the base.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A permanent magnet rotor, comprising:
    a rotor rim and a plurality of permanent magnet modules arranged on an outer or an inner circumference of the rotor rim,
    the permanent magnet modules extending generally along an axial direction and being of substantially constant axial-cross section, and each permanent magnet module comprising
        a base adapted to be fixed to the rotor rim, a plurality of permanent magnets all configured in pairs of permanent magnets, and one or more pole pieces, wherein
        each of the permanent magnets is retained in the permanent magnet module and has a circumferential magnetic orientation and is substantially rectangular in axial cross-section and wherein
        each of the permanent magnets is inclined with respect to a radial plane of the magnet; and
    wherein the permanent magnet modules comprise a central magnet support structure between the permanent magnets of each pair of permanent magnets shaped substantially as an inverted triangle in axial cross-section, the inverted triangle having an apex that separates the permanent magnets of each pair of permanent magnets and is spaced from the base by a central cooling channel that is common to an end edge of each permanent magnet in the pair of permanent magnets.

2. The permanent magnet rotor according to claim 1, wherein one or more of the permanent magnet modules comprises two axial rows of magnets.

3. The permanent magnet rotor according to claim 1, wherein all the permanent magnet modules are substantially identical.

4. The permanent magnet rotor according to claim 1, wherein the one or more pairs of permanent magnets of the permanent magnet modules are defined by a first and a second axial row of permanent magnets.

5. The permanent magnet rotor according to claim 4, wherein the central cooling channel extends from an edge of the row of first magnets to an edge of the row of second magnets.

6. The permanent magnet rotor according to claim 1, wherein each of the permanent magnet modules comprises two pairs of permanent magnets defined by four axial rows of magnets.

7. The permanent magnet rotor according to claim 1, wherein the magnets are mounted on top of the base and/or pole pieces.

8. The permanent magnet rotor according to claim 1, wherein the magnets are screwed to the permanent magnet modules.

9. The permanent magnet rotor according to claim 1, wherein the magnets are glued to the base and/or pole pieces.

10. The permanent magnet rotor according to claim 1, further comprising a plurality of anchors for fixing the permanent magnet modules to the rotor rim, wherein
    each of the bases of the permanent magnet modules have a bottom surface adapted to be fit to the inner or outer circumference of the rotor rim, and two axially extending side surfaces, and
    the two side surfaces of the base each comprise an axially extending groove, and wherein
    the anchors have a shape that fits in axially extending grooves of neighbouring permanent magnet modules.

11. The permanent magnet rotor according to claim 10, wherein the anchors are substantially T-shaped.

12. The permanent magnet rotor according to claim 1, wherein each of the permanent magnet modules comprises a plurality of radial holes, and wherein the permanent magnet modules are fixed to the rotor rim by a plurality of bolts inserted in the radial holes.

13. The permanent magnet rotor according to claim 1, wherein the base and pole pieces are formed by a stack of metal sheets.

14. A wind turbine comprising a generator having the permanent magnet rotor according to claim 1.

15. The permanent magnet rotor according to claim 1, wherein the base and pole pieces of the permanent magnet modules are integrally formed and the permanent magnets are embedded in the permanent magnet modules.

* * * * *